April 2, 1957  J. P. CARR ET AL  2,787,403
PUMPING APPARATUS
Filed Sept. 1, 1953  3 Sheets-Sheet 1
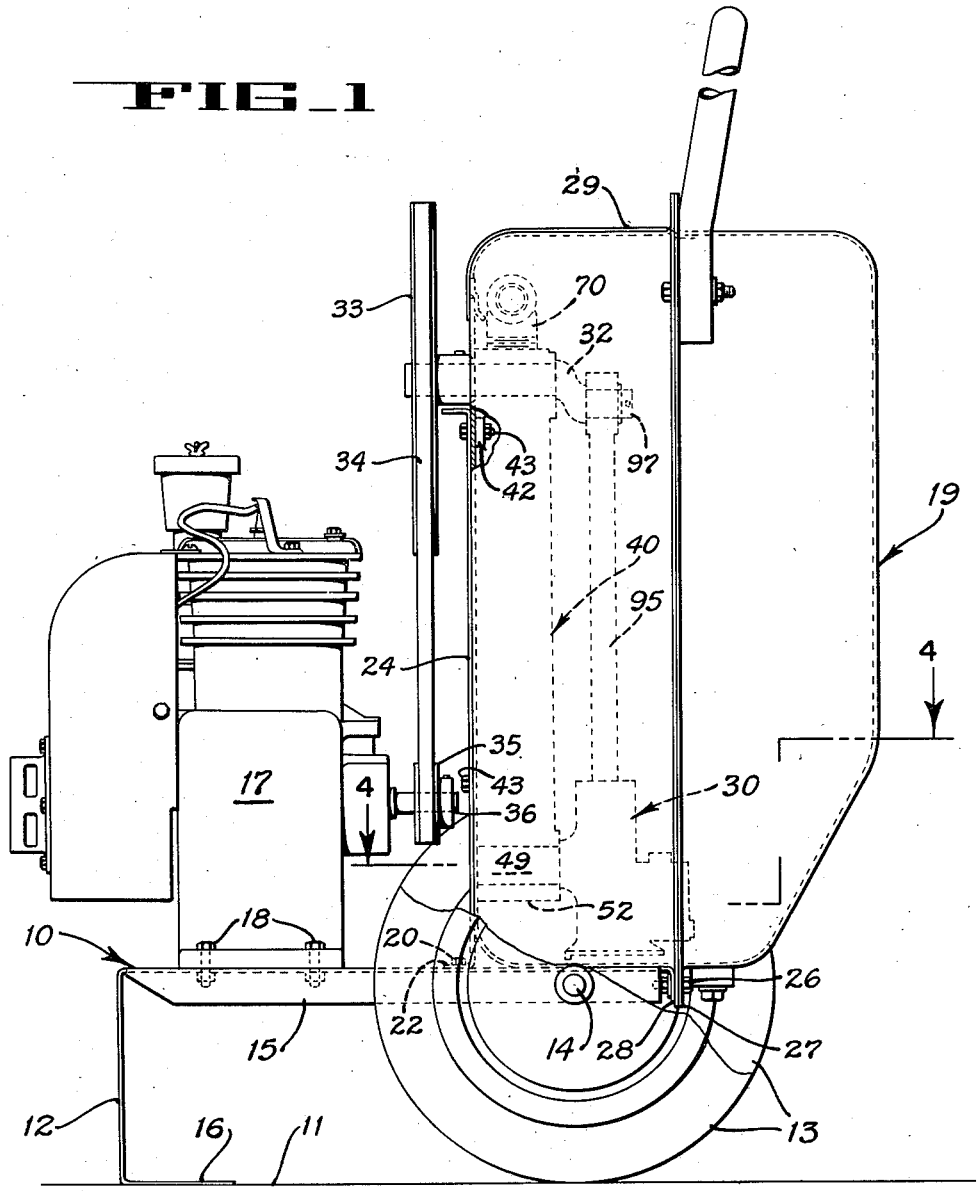
FIG_1
INVENTORS
JAMES P. CARR
CLIFFORD J. GRIFFITH
BY Hans G. Hoffmeister
ATTORNEY

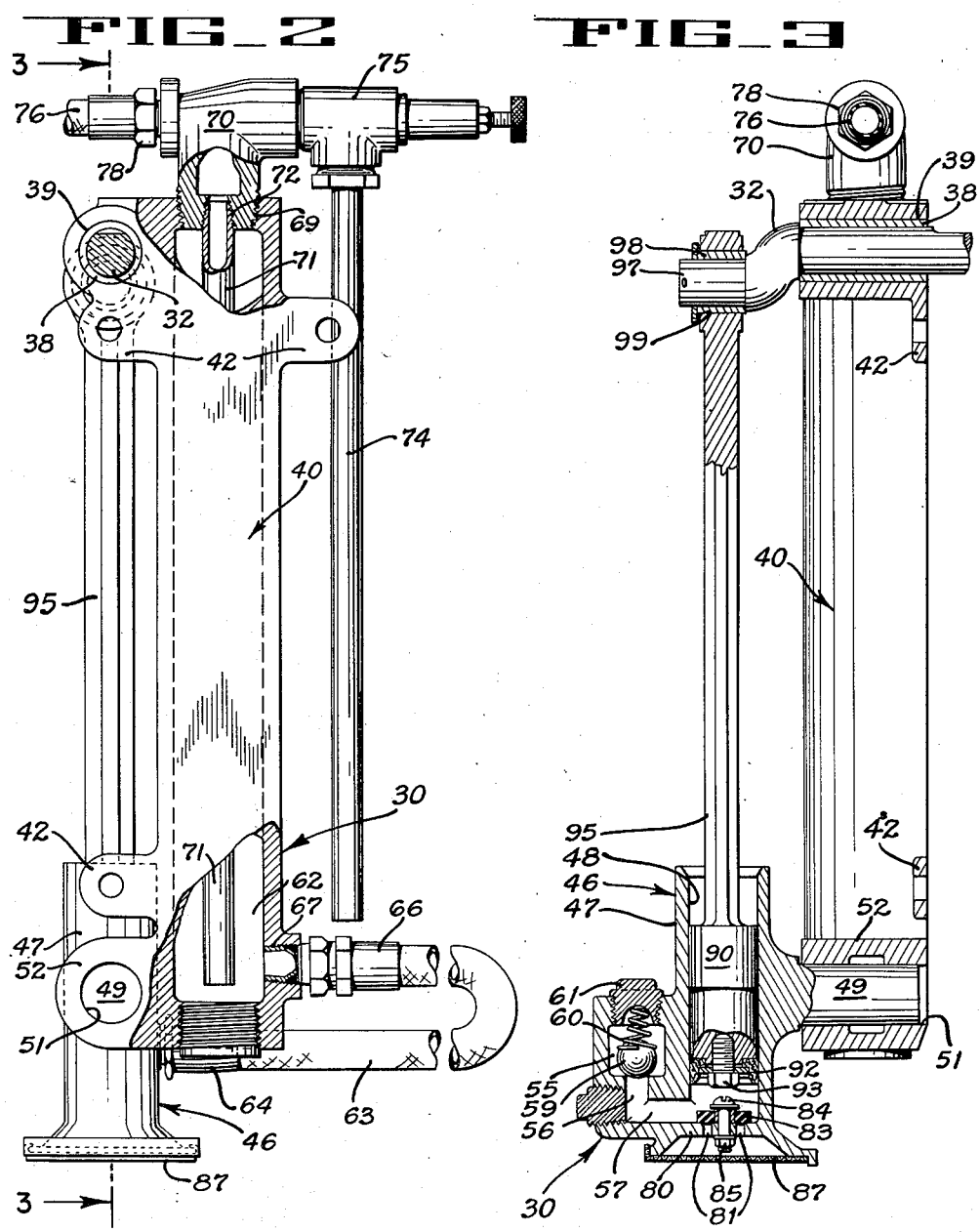

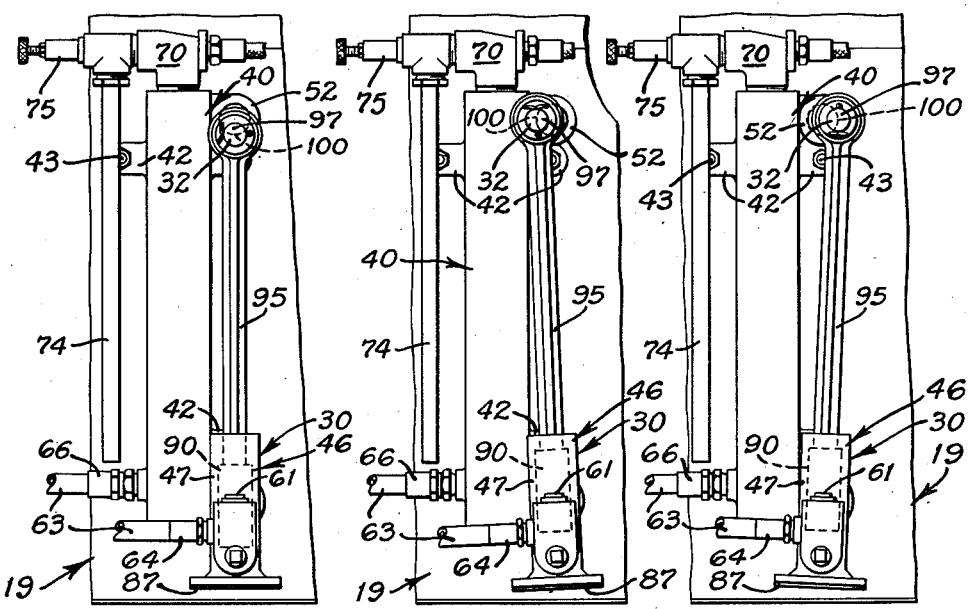
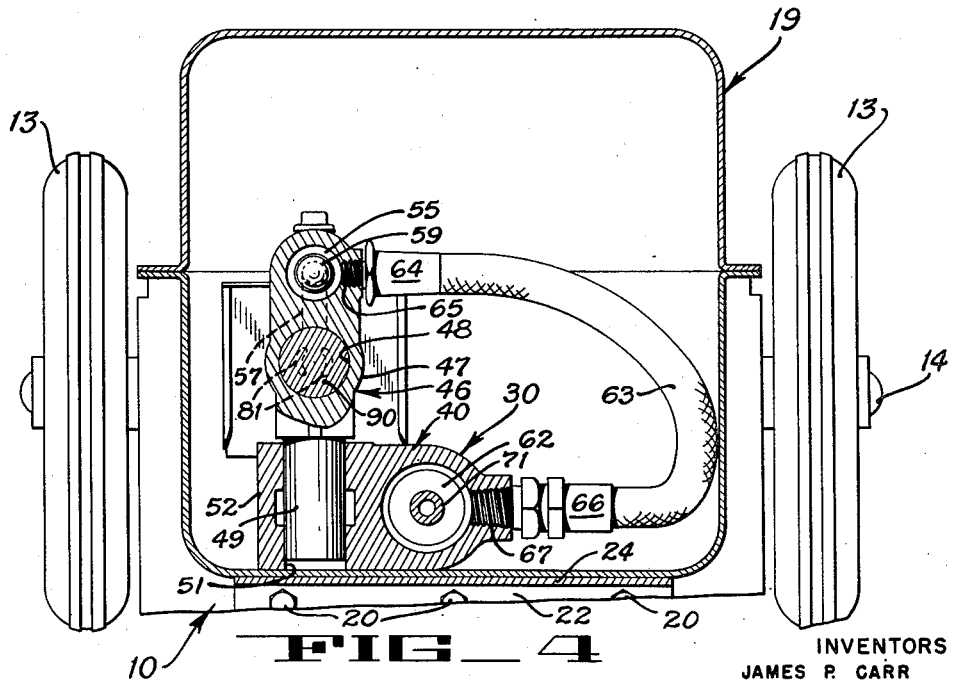

UnitedStates Patent Office 2,787,403
Patented Apr. 2, 1957

2,787,403

PUMPING APPARATUS

James P. Carr, Lansing, and Clifford J. Griffith, Dimondale, Mich., assignors to Food Machinery and Chemical Corporation, San Jose, Calif., a corporation of Delaware Application September 1, 1953, Serial No. 377,948

8 Claims. (Cl. 222—178)

This invention relates to spraying apparatus and more particularly to pumping arrangements for use with spraying apparatus.

It is an object of the present invention to provide pumping apparatus having a novel system for lubricating and cooling the moving parts of the pump.

Another object is to provide a pumping unit, for spraying apparatus, incorporating a novel mechanism for continuously agitating the spray material in the reservoir of the unit.

Another object is to provide a pumping arrangement, for spraying apparatus, in which a pump is mounted in a fluid reservoir in such a manner as to provide an exceptionally compact unit.

Other and further objects and advantages of the present invention will become apparent from the following description taken in connection with the accompanying drawings in which:

Fig. 1 is a side elevation, with parts broken away, of a portable spraying machine provided with a pump constructed in accordance with the teaching of the present invention.

Fig. 2 is an elevation, with parts broken away, of the pump unit of the machine of Fig. 1 shown disconnected from the machine.

Fig. 3 is a vertical section taken on line 3—3 of Fig. 2.

Fig. 4 is a horizontal section taken on line 4—4 of Fig. 1.

Figs. 5, 6 and 7 are fragmentary elevations, similar to Fig. 2, showing three different operating positions of the pump unit.

In Fig. 1 the reference numeral 10 indicates a platform which is supported in spaced relation above a surface 11 by a post 12 and a pair of wheels 13 rotatably mounted on an axle 14 which extends through aligned holes in downturned flanges 15 of the platform 10. The post 12 has an inturned foot portion 16. A gasoline engine 17 is secured on the forward end of the platform 10 by a plurality of bolts 18. A sheet metal tank 19 is secured on the rearward end of the platform 10 by bolts 20 which clamp an outturned flange 22 of a tank mounting plate 24 to the platform 10, and by bolts 26 which secure a lateral flange 27 of the tank to a flange 28 of the platform. The tank has a removable access plate 29 covering an opening in the upper end of the tank through which spray material may be put in the tank.

A pump unit 30 is mounted inside the tank 19 wholly or partially submerged in the liquid stored therein. The pump has a crankshaft 32 that extends through the front wall of the tank and is keyed, exteriorly of the tank, to the hub of a sheave 33. The crankshaft is driven by the engine 17 through a V-belt 34 trained around the sheave 33 and around a sheave 35 keyed to the engine shaft 36. Interiorly of the tank, the crankshaft 32 is rotatably journalled in a bearing sleeve 38 (Fig. 3) disposed in a cylindrical opening 39 in a support bracket 40. The bracket 40 is provided with apertured tabs 42 (Figs. 2 and 3) through which bolts 43 (Fig. 1) extend to mount the bracket on the inner surface of the forward wall of the tank.

The pump unit 30 comprises a housing 46 (Fig. 3) having a central body portion 47 with a vertical cylindrical bore 48. An integrally formed stub shaft 49 extends outwardly from one side of the body portion 47 and is rotatably journalled in a cylindrical bore 51 provided in a lateral extension 52 (Fig. 2) of the bracket 40. The central body portion 47 of the pump housing 46 (Fig. 3) has a lateral extension on the side opposite the stub shaft 49 to provide a discharge chamber 55 (Figs. 3 and 4) which communicates with the central bore 48 through passages 56 and 57. A ball type check valve 59 (Fig. 3) disposed in the discharge chamber 55, is arranged to move on and off a valve seat formed at the opening of the passage 57 into the chamber 55 to control the flow of liquid from the passage 56 to the discharge chamber. A coil spring 60 extends between the ball check valve 59 and an adjustable threaded plug 61 to yieldingly retain the valve on its seat. By adjusting the plug 61 the resistance of the check valve 59 may be varied.

The discharge chamber 55 is connected to an air pressure chamber 62 (Figs. 2 and 4) by means of a flexible hose 63 which has a connector 64 (Fig. 4) at one end threaded into an opening 65 in the side wall of the pump housing 46 and a connector 66 (Fig. 2) threaded into an opening 67 in the wall of the bracket 40. The pressure chamber 62, which is formed in the bracket 40, is generally cylindrical and extends substantially the full length of the bracket. At the upper end of the bracket 40, a tapped hole 69 extends through the wall and is arranged to receive the threaded end of a discharge T 70. A pipe 71 is threaded into a threaded opening 72 in the T and extends downwardly to a point adjacent the bottom of the air pressure chamber 62. A bypass pipe 74 is connected through a relief valve 75 to the discharge T 70. A discharge line 76, which may be connected to a spray gun, a spray boom, or the like, is secured to the discharge T 70 by a connector 78.

The pump housing 46 has a bottom wall 80 (Fig. 3) in which two inlet passages 81 are formed. These passages 81 are arcuate in shape, as seen in Fig. 4. Flow of liquid into the pump housing from the tank is controlled by a suction valve in the form of a rubber ring 83 loosely held over the passages 81 by a bolt 84 which extends through the bottom wall 80 of the pump and carries a nut 85 on its lower end. The effective length of the bolt 84 is such that the rubber ring is allowed to move upwardly away from the bottom wall during the suction stroke of the pump piston to permit liquid to pass under the rubber ring and into the passage 57. A screen 87 is removably attached to the lower end of the pump housing to filter the liquid as it moves toward the suction valve.

A piston 90 is mounted for sliding, reciprocating movement in the cylindrical bore 48 of the pump body. The piston has the usual flexible plunger packing 92 secured by a screw 93 to its lower end. A piston rod 95 is integrally formed on the piston 90 and extends outwardly of the pump housing for pivotal connection at its upper end to one end 97 of the crankshaft 32. The crankshaft 32 is rotatably journalled in a bearing sleeve 98 disposed in a cylindrical opening 99 in the upper end of the piston rod.

In operation, the engine 17 drives the crankshaft 32 causing the crankshaft end 97 to move in a circular path 100, indicated in dotted lines in Figs. 5, 6 and 7. Since the stub shaft 49 of the pump housing is rotatably journalled in the fixed bracket 40, the pump housing 46 will pivot, as shown in Figs. 5, 6 and 7, around the axis of the stub shaft 49. This pivoting movement of the pump body continuously agitates the liquid in the tank. Since certain spray materials contain substances that tend to settle out of solution, this novel method of agitating the liquid in the tank performs a very useful function. It should be noted also that, since the pump is submerged in the tank, all the working parts of the pump are lubricated and cooled by the spray material itself. Particularly it will be seen in Fig. 3 that the upper end of the cylindrical bore 48 opens into the tank providing a passage through which the liquid spray reaches the cylinder wall.

On each suction stroke of the piston 90, a charge of liquid is drawn into the passage 57 through the suction valve 83. On the downstroke of the piston, the suction valve 83 is closed and the liquid is forced through the passage 56 into the chamber 55 from which it is discharged into the flexible conduit 63. Upon entering the air pressure chamber 62, the liquid compresses the air therein thus causing the chamber 62 to act as a surge chamber. The location of the entrance of the discharge tube 74 near the bottom of the chamber 62 permits the withdrawal of liquid without disturbance of the air cushion in the pressure chamber 62.

From the foregoing description it will be recognized that in this invention there is provided a particularly compact spraying unit made possible by mounting the surge chamber inside the storage tank and supporting the pump and the relief valve from the surge chamber structure in the tank. This latter feature has the added advantage of making unnecessary the provision of separate support structures for these members.

It will be understood that modifications and variations may be effected without departing from the scope and spirit of the present invention.

We claim:

1. Pumping apparatus comprising a storage tank, a surge tank provided within said storage tank and having an inlet port in a lower wall portion and a discharge opening in an upper wall portion, a pump pivotally supported from said surge tank within said storage tank and arranged upon actuation to deliver liquid from said storage tank to said surge tank through said inlet port, a discharge tube projecting downwardly through the discharge opening in the upper wall portion of said surge tank to a point adjacent the bottom of said tank, and means for actuating said pump in such a manner as to oscillate it about its pivotal support.

2. Pumping apparatus comprising a tank, an elongated bracket mounted on the inner surface of one wall of said tank, means defining a cylindrical bearing surface adjacent one end of said bracket, means defining an elongated surge chamber in said bracket and an inlet port at one end of said chamber and an opening at the opposite end of the chamber, a tubular discharge member secured in the opening and extending into said chamber to a point adjacent said inlet port, and a pump pivotally mounted in said cylindrical bearing surface and arranged to deliver liquid from said storage tank to said surge chamber.

3. Pumping apparatus comprising a storage tank having an opening in its wall, a bracket mounted on the inner surface of said wall and arranged to define a surge chamber in said tank, a pump disposed inside said tank on said bracket, a crankshaft operatively connected to said pump to actuate the same and extending through the opening in said wall, means exteriorly of said tank for rotating said crankshaft, a line communicating said pump with the lower end of said surge chamber, and a discharge line leading from said surge chamber.

4. Pumping apparatus comprising a tank having an opening in one wall, a mounting bracket secured to the inner surface of said one wall of said tank, means defining a first bearing in said bracket in alignment with the opening in the wall, means defining a second bearing in said bracket spaced from said first bearing, a pump housing disposed in said tank and having a pumping chamber communicating with a cylindrical opening in one wall of the housing, means defining an inlet port and an outlet port for said pumping chamber, a stub shaft connected to said housing and rotatably journalled in said second bearing, a piston slidably disposed in said cylindrical opening, a piston rod connected to said piston and extending through said one wall of the pump housing, a crankshaft journalled for rotation in said first bearing and extending through the opening in the wall of said tank for pivotal connection to said piston rod at a point spaced from said piston, and means for rotating said crankshaft.

5. Pumping apparatus comprising a platform, a pair of spaced wheels rotatably secured to said platform, a prime mover mounted on said platform, a tank mounted on said platform, a reciprocating pump mounted inside said tank, a crankshaft operatively connected to the piston of said pump to effect pumping of liquid upon rotation of said crankshaft, said crankshaft having a portion extending through said tank to a point exteriorly thereof, means connecting the drive shaft of said prime mover to said crankshaft, and a support post depending from said platform to cooperate with said wheels to provide a three-point support for said platform.

6. Pumping apparatus comprising a wheeled support platform, a storage tank for liquid to be pumped mounted on said platform and having a rear wall adjacent the rear end of said platform and a forward wall with an opening therein, a pump mounted in said tank, a shaft operatively connected inside said tank to said pump and projecting through the opening in said forward wall, an engine mounted on the forward end of said platform and having a drive shaft projecting rearwardly, and means for connecting the drive shaft of said prime mover to the shaft of said pump exteriorly of said tank.

7. Pumping apparatus comprising a platform, a wheel rotatably mounted on each side of the rear end of said platform, a support member secured to the forward end of said platform and projecting downwardly therefrom, said support member and said wheels cooperating to provide a three point support for said platform, a storage tank for liquid to be pumped mounted on said platform between said wheels and having a forward wall with an opening therein, a pump mounted in said tank, a shaft operatively connected to said pump inside said tank and projecting through the opening in the forward wall of the tank, a prime mover mounted adjacent the forward end of said platform, a drive shaft extending rearwardly from said prime mover, and means for operatively connecting said drive shaft with said pump shaft.

8. Pumping apparatus comprising a tank adapted to hold a quantity of liquid to be pumped, a pump housing disposed in the liquid in said tank and mounted for pivotal movement about a fixed axis, means defining a pumping chamber in said housing and a cylindrical opening in one wall of said housing in communication with said pumping chamber and with said tank, a piston mounted for reciprocation in said cylindrical opening, a piston rod connected to said piston and extending outwardly through the cylindrical opening, said opening having a lateral dimension sufficient to permit lateral movement of said piston rod during reciprocation of said piston, and means for simultaneously reciprocating said piston rod and moving the end of the rod remote from said piston in a fixed circular path, whereby said pump housing is pivoted about said fixed axis as said piston is reciprocated.

References Cited in the file of this patent

UNITED STATES PATENTS

| Number | Name | Date |
|---|---|---|
| 69,250 | Reynolds | Sept. 24, 1867 |
| 316,631 | Lenhardt | Apr. 28, 1885 |
| 1,088,608 | Mitchell | Feb. 24, 1914 |
| 1,724,553 | Bennett | Aug. 13, 1929 |
| 1,751,323 | Gray | Mar. 18, 1930 |
| 1,787,751 | Mathewson | Jan. 6, 1931 |
| 1,960,389 | McFerran | May 29, 1934 |
| 2,187,684 | Fox et al. | Jan. 16, 1940 |